9674X
W. Hitchcock,
Water Wheel,
Patented May 23, 1836.
Top View.
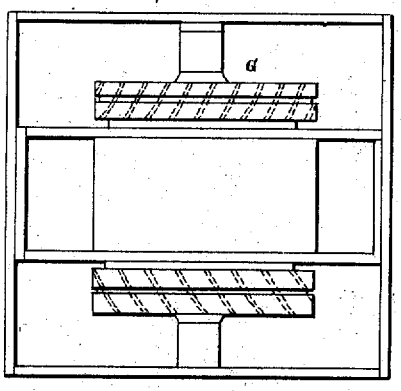
Top.
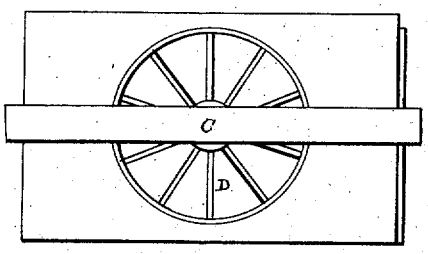
Side.
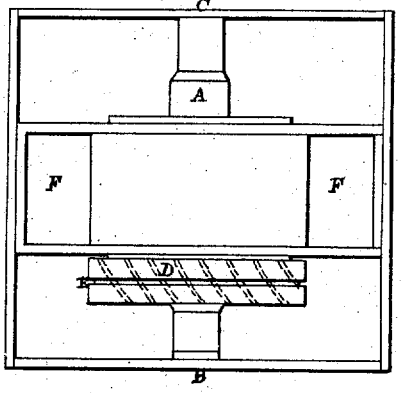
N. PETERS. PHOTO-LITHOGRAPHER, WASHINGTON, D. C.

9674 May 23 1836 289

William Hitchcock, of Spencer, N. York.
Letters Patent

The schedule referred to in these Letters Patent and making part of the same containing a description in the words of the said William Hitchcock, himself of his improvement in the reacting water wheel –

Be it known that I, William Hitchcock of the Town of Spencer in the County of Tioga, and State of New York, have invented a new and useful improvement in the reacting water wheel, which is described as follows, reference being had to the annexed drawings of the same making part of this Specification. This water wheel consists of a vertical shaft A. turning on pivots B & C. at each end, in boxes: – the lower one B. set in the sill of the frame, & the upper one C, in the cap piece –
Around this shaft are set in an angular position any convenient number of curved buckets D. which buckets are surrounded by a hoop or rim of wood E. banded with iron. The water is admitted to the wheel through openings F. made in the curb which surrounds the wheel, and acts upon it by reaction – the wheel turning in a contrary direction from that in which the water escapes, tho' the throats on the principle of the Barker Mill. I sometimes construct my mill with two or more reacting wheels, placed on a shaft lying horizontally as shewn at G. the water being admitted thro' vertical openings constructed in the curb and acting upon the wheels, by reaction as before described – the wheels turning vertically instead of horizontally – What I claim as my invention and which I desire to secure by Letters Patent consists in the before described reacting water wheels –

Witnesses
Wm P. Elliot
Billy Todd

Wm Hitchcock

[illegible]

Drawing

Granted May, 23. 1836)

Exd.
Wyl.